(12) United States Patent
Skoglund et al.

(10) Patent No.: US 12,389,921 B2
(45) Date of Patent: Aug. 19, 2025

(54) NOZZLE ARRANGEMENT FOR A POWDER HANDLING APPARATUS

(71) Applicant: Tetra Laval Holdings & Finance S.A., Pully (CH)

(72) Inventors: Tomas Skoglund, Lund (SE); Stefan Sas-Korczynski, Lund (SE); Blandine Malecot, Beaupréau (FR); Antoine Baron, Cholet (FR)

(73) Assignee: Tetra Laval Holdings & Finance S.A., Pully (CH)

( * ) Notice: Subject to any disclaimer, the term of this patent is extended or adjusted under 35 U.S.C. 154(b) by 476 days.

(21) Appl. No.: 17/775,302

(22) PCT Filed: Dec. 17, 2020

(86) PCT No.: PCT/EP2020/086671
§ 371 (c)(1),
(2) Date: May 8, 2022

(87) PCT Pub. No.: WO2021/122916
PCT Pub. Date: Jun. 24, 2021

(65) Prior Publication Data
US 2022/0386638 A1    Dec. 8, 2022

(30) Foreign Application Priority Data
Dec. 20, 2019   (EP) .................................. 19218844

(51) Int. Cl.
*A23C 9/123*   (2006.01)
*A23C 9/16*   (2006.01)
*B08B 5/02*   (2006.01)

(52) U.S. Cl.
CPC .............. *A23C 9/1232* (2013.01); *A23C 9/16* (2013.01); *B08B 5/02* (2013.01)

(58) Field of Classification Search
CPC ....... A23C 19/086; A23C 9/1232; A23C 9/16; A23L 2/39; B08B 5/02
(Continued)

(56) References Cited

U.S. PATENT DOCUMENTS 3,697,286 A * 10/1972 Grun ...................... A23P 10/40
                                                          426/302
4,326,810 A    4/1982 Schofield et al.
(Continued)

FOREIGN PATENT DOCUMENTS

CN    106269708 A    1/2017
CN    107824368 A    3/2018
(Continued)

OTHER PUBLICATIONS

Extended European Search Report issued Apr. 30, 2020, for priority European Patent Application No. 19218844.9.
(Continued)

*Primary Examiner* — Ibrahime A Abraham
*Assistant Examiner* — Joseph W Iskra
(74) *Attorney, Agent, or Firm* — Renner, Otto, Boisselle & Sklar, LLP (57) ABSTRACT

An apparatus and method for handling a food product powder includes a sealable container having an interior surface defining a volume in which the food product powder is handled, and a powder outlet, and a nozzle arrangement that is attached to the container and configured to feed air into the container. The nozzle arrangement has a plurality of jet nozzles configured to direct the air towards the interior surface to remove product powder from the interior surface, such that the air and the removed product powder may flow out of the container via the powder outlet.

6 Claims, 5 Drawing Sheets

(58) Field of Classification Search
USPC .......................................................... 99/453
See application file for complete search history.

(56) References Cited

U.S. PATENT DOCUMENTS

| | | | |
|---|---|---|---|
| 4,511,258 A * | 4/1985 | Federighi | ............ B01F 25/4315 |
| | | | 366/337 |
| 11,312,054 B2 | 4/2022 | Zhai et al. | |
| 2019/0217519 A1* | 7/2019 | Zhai | ......................... B04C 5/22 |
| 2019/0329201 A1 | 10/2019 | Beetz et al. | |

FOREIGN PATENT DOCUMENTS

| | | | |
|---|---|---|---|
| CN | 207414341 U | | 5/2018 |
| CN | 209271892 U | | 8/2019 |
| DE | 3900664 A1 | | 7/1990 |
| DE | 102011112016 B3 | | 1/2013 |
| DE | 102013006822 | * | 10/2014 |
| DE | 102013006822 A1 | | 10/2014 |
| EP | 3513882 A1 | | 7/2019 |

OTHER PUBLICATIONS

International Search Report mailed Mar. 12, 2021, for priority International Patent Application No. PCT/EP2020/086671.
Zhang; Catalogueing in publication (CIP) data; Food processing technology equipment; China Light Industry Press; 2007; 2nd edition, 1st print.

* cited by examiner

NOZZLE ARRANGEMENT FOR A POWDER HANDLING APPARATUS

TECHNICAL FIELD

The invention relates to a device and method for cleaning an apparatus for handling a food product power.

TECHNICAL BACKGROUND

Product powders may be used to produce various food products. Using product powders are advantageous in that the powder may be stored for long periods of time without being spoiled. The powder may also be easily dissolved in a liquid to form the desired product. Food products formed by powders may include dairy beverages, such as milk, non-dairy beverages, such as soft drinks, and other dairy products such as ice cream, yogurt, or cheese. Product powders may include raw materials such as sugar, milk powder, salt, or flour, or finished products such as instant formula, instant drinks, or dry broth. In producing a milk alternative that resembles fresh dairy milk, raw milk powder may be used. The raw milk powder dissolves easily in water to form a reconstituted liquid milk that undergoes further processing, including filtration, homogenization, and heat treatment, to form the final beverage product. Other form of food product powders are such ingredients that are mixed together to form bake mixtures and cake mixtures.

Product powders may require a mixing process which often occurs in a sealable container including a stirring arrangement, paddle mixers, or other suitable mixing devices. After mixing and emptying the product mixture from the sealable container, a residual powder may remain on the interior walls of the sealable container. A conventional method for cleaning the interior walls includes maintenance personnel manually removing the powder using industrial vacuum cleaners. The conventional cleaning method is deficient in that the cleaning process is labor-intensive. The conventional cleaning method may also require opening the container causing the container interior to be susceptible to contamination.

SUMMARY

It is an object of the invention to at least partly overcome one or more limitations of the prior art. In particular, it is an object to provide a device and method that accomplish efficient cleaning of an apparatus for handling a food product powder.

According to an aspect of the invention, an apparatus for handling a food product powder includes a sealable container having an interior surface defining a volume in which the food product powder is handled, and a powder outlet, and a nozzle arrangement that is attached to the container and configured to feed air into the container. The nozzle arrangement includes a plurality of jet nozzles configured to direct the air towards the interior surface to remove product powder from the interior surface, such that the air and the removed product powder may flow out of the container via the powder outlet.

Accordingly, the cleaning according to the invention is not done in the traditional way, i.e. by opening the container and manually using a vacuum cleaner to remove the powder from the interior surface and out of the container. Instead, the powder is removed from the interior surface using the jet nozzles that direct the air towards the interior surface, and the removed powder and air may be drawn out of the container. The apparatus for handling a food product powder described herein is advantageous in that the apparatus enables cleaning in a very efficient and sanitary manner. The container may remain closed during the cleaning process. The apparatus includes multiple sets of jet nozzles that are arranged to direct the flow of air towards different walls of the container, and the jet nozzles may be arranged to have a predetermined impact angle of the flow of air hitting the respective surface. The arrangement of the jet nozzles is advantageous in ensuring that the powder is removed from the respective surface such that it may be drawn out of the container.

According to another aspect of the invention, a method for cleaning is used for an apparatus for handling a food product powder that includes a sealable container having an interior surface defining a volume in which the food product powder is handled, and a powder outlet. The method includes feeding air into the container using a nozzle arrangement that is attached to the container, wherein the air is directed by a plurality of jet nozzles towards the interior surface to remove product powder from the interior surface, and drawing air out from the container, such that air and the removed product powder may flow out of the container via the powder outlet.

This method may include the same features as the apparatus for handling a food product powder and shares the same advantages.

Still other objectives, features, aspects and advantages of the invention will appear from the following detailed description as well as from the drawings.

BRIEF DESCRIPTION OF THE DRAWINGS

Features of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
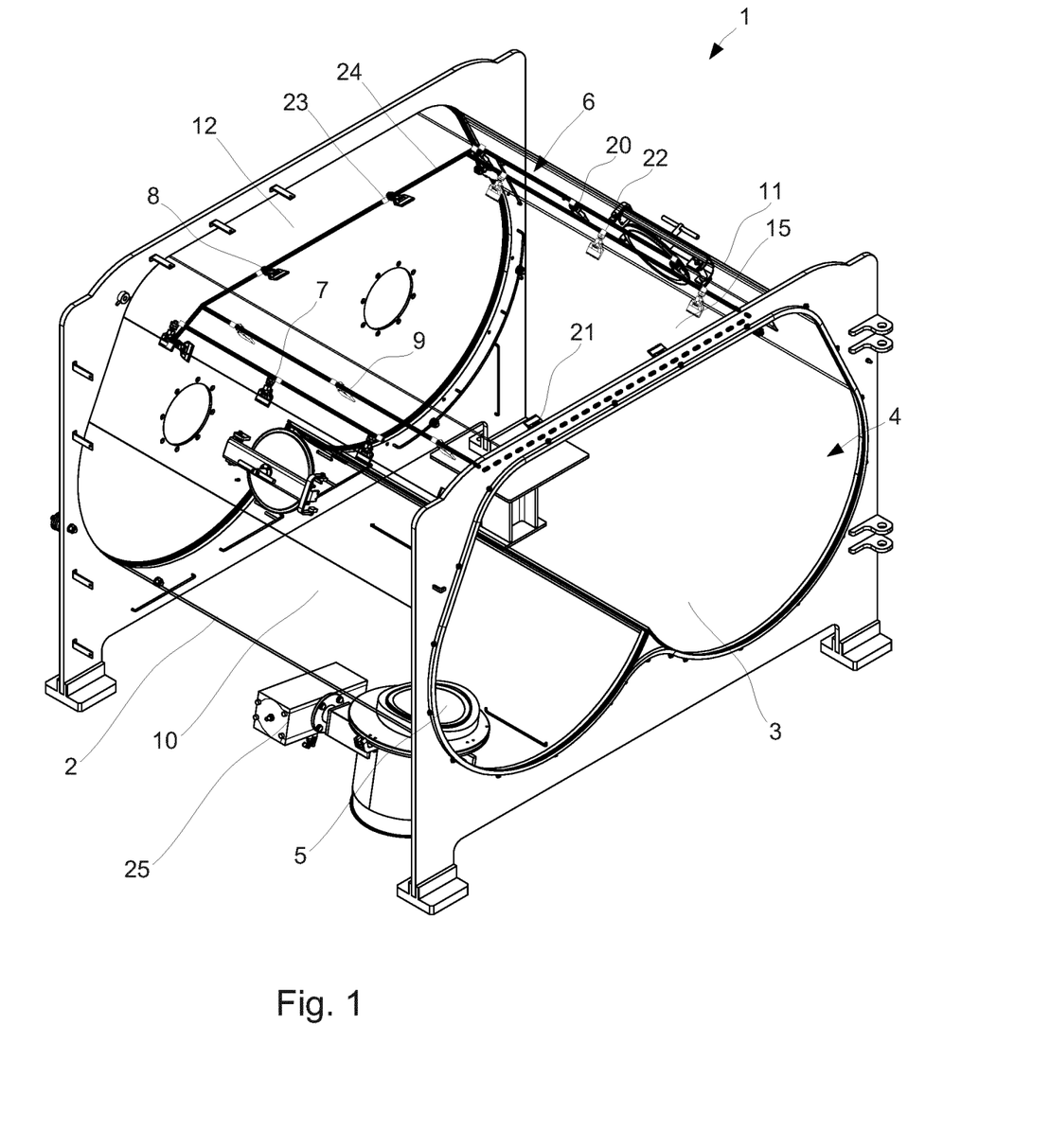
FIG. 1 is a perspective sectional view of an apparatus for handling a food product powder.

Referring first to FIG. 1, an apparatus 1 for handling a food product powder is shown. The apparatus 1 includes a sealable container 2 having an interior surface 3 that defines a volume 4 in which the food product powder is handled, and a powder outlet 5. The apparatus 1 may be oriented horizontally such that the powder outlet 5 is arranged at a bottom of the apparatus 1. A nozzle arrangement 6 is attached to the container 2 and is configured to feed air into the container 2 for removing residual food product powder from the container 2 during a cleaning process that occurs after as much as possible of the food product powder has been removed from the container 2 for packaging or further processing. The nozzle arrangement 6 includes a plurality of jet nozzles 7, 8, 9 that are configured to direct the air towards the interior surface 3 to remove the product powder from the interior surface 3. After the product powder is removed from the interior surface 3, the air and the removed product powder exit the container 2 via the powder outlet 5.

Figure 2:
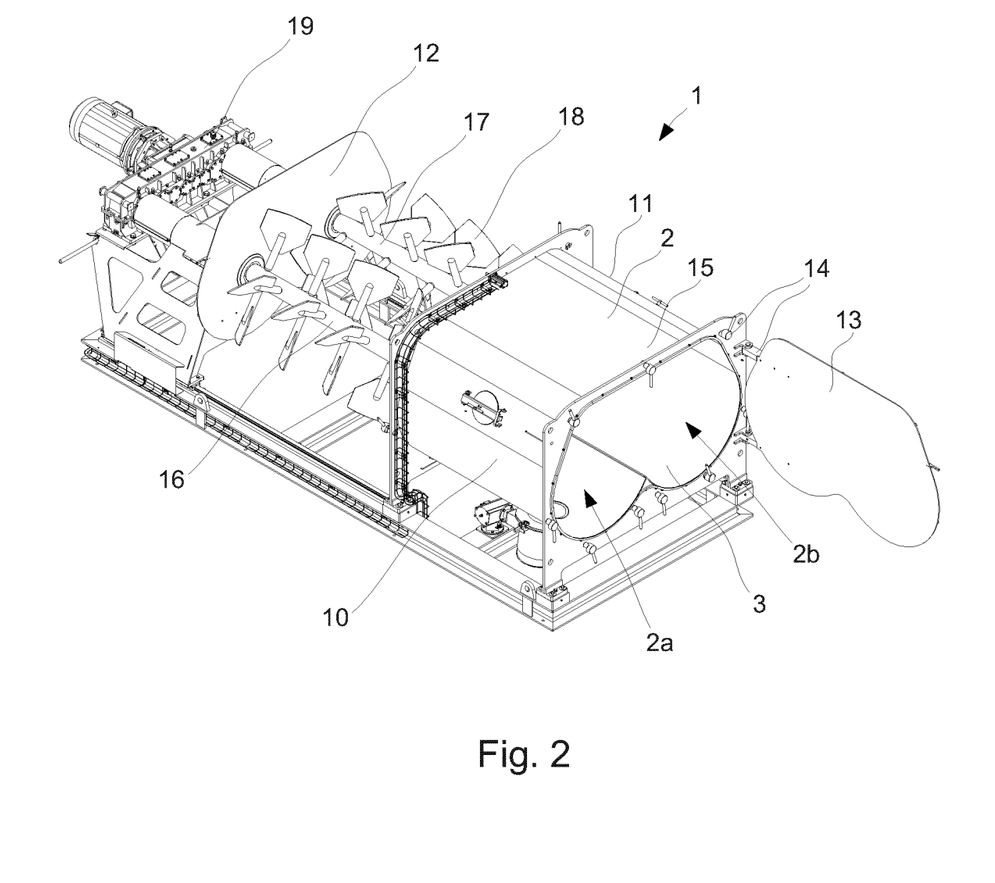
FIG. 2 is a perspective sectional view of the apparatus for handling a food product powder of FIG. 1 including a stirring arrangement.

Referring in addition to FIG. 2, handling the food product powder in the container 2 may include stirring or mixing the food product powder to produce the food product. FIG. 2 shows an exemplary mixing arrangement for the apparatus 1. The food product may be a beverage product, such as a dairy beverage or a non-dairy beverage. The beverage product may include milk or soft drinks. The food product may include other non-beverage food products such as ice cream, yogurt, or cheese. The product powder may include any suitable ingredient to form the desired food product. The product powder may include raw materials such as sugar, milk powder salt, or flour, or finished product such as instant formula, instant drinks, or dry broth. Other product powders may be suitable. The apparatus 1 may not necessarily be used to stir or mix the food product powder. For example, the apparatus 1 may be used to transport the product powder and the nozzle arrangement 6 may be used for cleaning the apparatus 1 after the product powder is removed from the container 2.

The interior surface 3 of the container 2 is defined by a first side wall 10, a second side wall 11 that is opposite the first side wall 10, and a back wall 12 of the container 2 that extends between the first side wall 10 and the second side wall 11. As shown in FIG. 2, a front wall 13 is arranged opposite the back wall 12. The front wall 13 may be formed as a pivotable door for the container 2 and may be attached to the container 2 via handles and hinges 14. A top surface or ceiling 15 extends between the first side wall 10 and the second side wall 11, and between the back wall 12 and the front wall 13. The side walls 10, 11 may be angled relative to the ceiling 15 that extends horizontally. The container 2 and the interior surface 3 may have any suitable shape and the shape may be dependent on the application, such as whether the container 2 is used for housing a mixing or stirring arrangement, or for transport.

As shown in FIG. 2, a rotatable stirring device 16, 17 for stirring or mixing the product powder may be mounted to the back wall 12 and extend through the volume 4 of the container 2 when the apparatus 1 is assembled. The rotatable stirring device 16, 17 may include a first rotatable shaft 16 and a second rotatable shaft 17 that each includes mixing paddles 18. The rotatable shafts 16, 17 rotate in same or in an opposite rotational direction relative to each other during mixing of the product powder. The shape of the container 2 may be formed to accommodate rotation of the first rotatable shaft 16 and the second rotatable shaft 17. The side walls 10, 11 of the container 2 may each be formed to have a concave shape on their interior sides at the bottom of the container 2 such that each of the rotatable shafts 16, 17 are accommodated in a circular cavity 2a, 2b of the container 2. Other shapes may be suitable for the container 2. An engine 19 is arranged outside the container 2 and is coupled to the rotatable stirring device 16, 17 for rotation thereof. Any suitable engine or drive mechanism may be provided.

The nozzle arrangement 6 includes a plurality of sets of jet nozzles 7, 8, 9 that are mounted to the container 2 and arranged to direct a flow of air towards the interior surface 3. The distribution of the sets of jet nozzles 7, 8, 9 in the nozzle arrangement 5 is dependent on the shape of the container 2. The sets of jet nozzles 7, 8, 9 are arranged to ensure coverage of an entire area of the interior surface 3, meaning that product powder may be removed from the entire surface area of the interior surface 3. The sets of jet nozzles 7, 8, 9 may have an unsymmetrical distribution along the interior surface 3 of the container 2 and each jet nozzle in the sets of jet nozzles 7, 8, 9 may be arranged tangentially relative to a respective wall 10, 11, 12, 13. Each set of jet nozzles 7, 8, 9 may correspond to a different wall 10, 11, 12, 13 for directing air at the respective wall 10, 11, 12, 13. Jet nozzles within a single set may be evenly spaced and mounted in a similar orientation relative to the same wall 10, 11, 12, 13.

Three different sets of jet nozzles 7, 8, 9 are shown in FIG. 1. A first set of jet nozzles 7 includes jet nozzles 7, 20 that are arranged to direct a flow of air towards the side walls 10, 11. The jet nozzles 7, 20 may be evenly spaced and are angled relative to the respective side wall 10, 11. The jet nozzles 7 correspond to the first side wall 10 and the jet nozzles 20 correspond to the second side wall 11. Any suitable number of jet nozzles 7, 20 may be used, such as three or more jet nozzles per side wall 10, 11. Each side wall 10, 11 may have four jet nozzles that are arranged at an upper location along the respective side wall 10, 11 and configured to direct air at the respective wall 10, 11. The jet nozzles 7 corresponding to the first side wall 10 may have the same orientation and angle relative to the first side wall 10. Similarly, the jet nozzles 20 corresponding to the second side wall 11 may have the same orientation and angle relative to the second side wall 11. The jet nozzles 7 and the jet nozzles 20 may be symmetrically arranged relative to each other to direct air flow downwardly along the respective side wall 10, 11 for powder removal therefrom.

A second set of jet nozzles 7 includes jet nozzles 8, 21 that are arranged to direct a flow of air towards the ceiling 15 for removing product powder therefrom. The second set of jet nozzles 8, 21 may be arranged perpendicular relative to the first set of jet nozzles 8, 20 such that the second set of jet nozzles 8, 21 are arranged along a line that is parallel with the back wall 12 and the front wall 13 whereas the first set of jet nozzles 7, 20 are arranged along a line that is parallel with the side walls 10, 11. The jet nozzles 8 are arranged proximate the back wall 12 and the jet nozzles 21 are arranged opposite the jet nozzles 8 and proximate the front wall 13 (shown in FIG. 2). The jet nozzles 8 and the jet nozzles 21 may be symmetrically arranged relative to each other such that each set of jet nozzles 8, 21 directs air flow along the ceiling 15 towards the opposite set of jet nozzles 8, 21. Any suitable number of jet nozzles 8, 21 may be used, such as three or more jet nozzles. Four jet nozzles may be arranged proximate each of the back wall 12 and the front wall 13.

A third set of jet nozzles 9 includes jet nozzles 9, 22 that are arranged to direct a flow of air towards a center of the container 2 or any other common location for collection of the removed powder. The jet nozzles 9, 22 may be angled away from the ceiling 15 and the side walls 10, 11 to direct airflow that moves the removed powder from the ceiling and the side walls 10, 11 toward the center of the container 2, such that the air and the powder may be drawn out of the container from the powder outlet 5. The jet nozzles 9 may be arranged proximate the first side wall 10 and the jet nozzles 22 may be arranged proximate the second side wall 11. The jet nozzles 9, 22 may be symmetrically arranged relative to each other. Any suitable number of jet nozzles 9, 22 may be used. Three jet nozzles may be arranged proximate each of the side walls 10, 11.

The first, second, and third sets of jet nozzles 7, 8, 9 may be operated at different times and different jet nozzles within a set may also be operated at different times. Operation of each jet nozzle in the nozzle arrangement 6 may be controlled using a control valve 23 for each jet nozzle that independently controls the air passing through the respective jet nozzle. The control valves 23 may include any suitable activation device, such as a solenoid. Each control valve 23 is fluidly connected to a source of pressurized air (not shown) via a supply line 24. The source of pressurized air is connected to the supply line 24 via an air supply pipe (not shown). The supplied air may be filtered, sterilized, or dried and the source may be a compressor. The amount of air pressure in the supply line 24 may be maintained at a constant value.

During the cleaning process, the control valves 23 corresponding to the first and second sets of jet nozzles 7, 8 may first be opened to direct air flow at the ceiling 15 and the side walls 10, 11 to remove the powder. After the product powder is removed from the interior surface 3, the first and second sets of jet nozzles 7, 8 may be closed and the control valves 23 corresponding to the third set of jet nozzles 9 may be opened to direct the removed powder and the air toward the center of the container 2. Suction from a vacuum pump 46 (schematically shown in FIG. 6) that is connected to the powder outlet 5 may be used to draw the removed powder and the air out of the container 2 through the powder outlet 5. The powder outlet 5 may be opened and closed via a valve located in a passage of the powder outlet. This valve is operable by an actuator 25 that is configured to open and close the valve.

Figure 3:
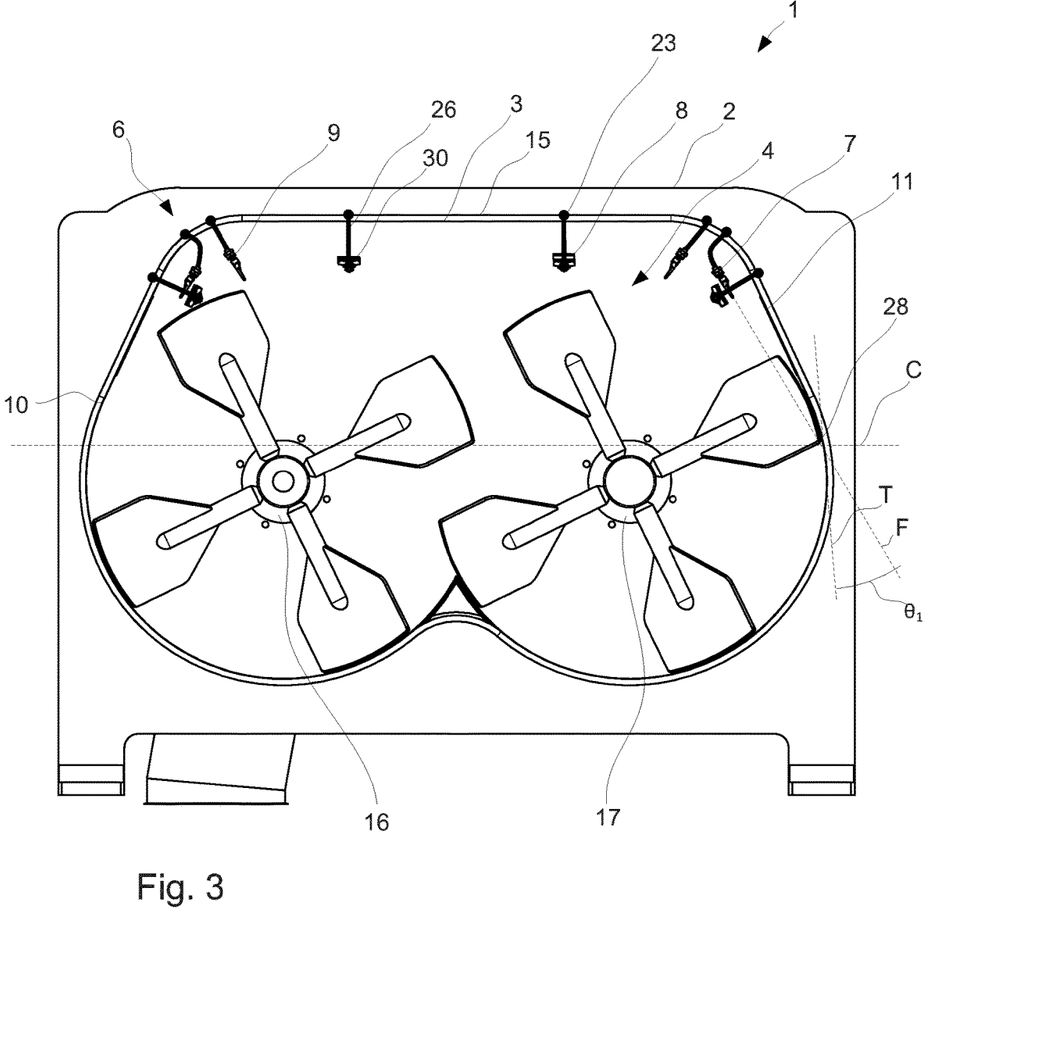
FIG. 3 is a front sectional view of the apparatus of FIG. 1.

Referring now to FIG. 3, a front sectional view of the apparatus 1 including the nozzle arrangement 6 and the rotatable stirring device 16, 17 is shown. FIG. 3 shows pipes 26 that are configured for both supplying air to the corresponding jet nozzle and for mounting each jet nozzle 7, 8, 9 to the container 2. The pipes 26 may be welded to the periphery of the container 2 and extend into the volume 4 to hold the jet nozzles 7, 8, 9 within the container 2. Each pipe 26 is fluidly connected to a respective control valve 23 and to the supply line 24 shown in FIG. 1. The supply line 24 may also be formed of piping that branches through the container 2. The nozzle arrangement 6 may be secured to the container 2 using any other suitable mounts, brackets, clamps, hooks, bolts, screws, and the like.

Each jet nozzle 7, 8, 9 is arranged to direct the flow of air at the respective surface such that the flow of air impacts the surface at a predetermined impact angle. The first set of jet nozzles 7 that correspond to the side walls 10, 11 includes jet nozzles that are arranged to direct the flow of air towards the first or second side wall 10, 11 at an impact angle $\theta_1$ that is between 5 and 25 degrees relative to the respective side wall 10, 11. The impact angle $\theta_1$ may be between 10 and 20 degrees, or between 12 and 18 degrees. The impact angle $\theta_1$ may be defined as the angle between the flow direction F of the air and the tangential direction T of the surface at the point of impact 28 of the air flow. The point of impact 28 of the air flow on the respective side wall 10, 11 may be between 10 and 80 centimeters from the outlet of the jet nozzle 7, or even outside this range. As also shown in FIG. 3, the third set of jet nozzles 9 are angled away from the walls 10, 11 to direct the flow of air towards a horizontal center-plane C of the container 2. The center plane C may be defined as a horizontal plane that divides the volume 4 into two volumes of equal size.

Figure 4:
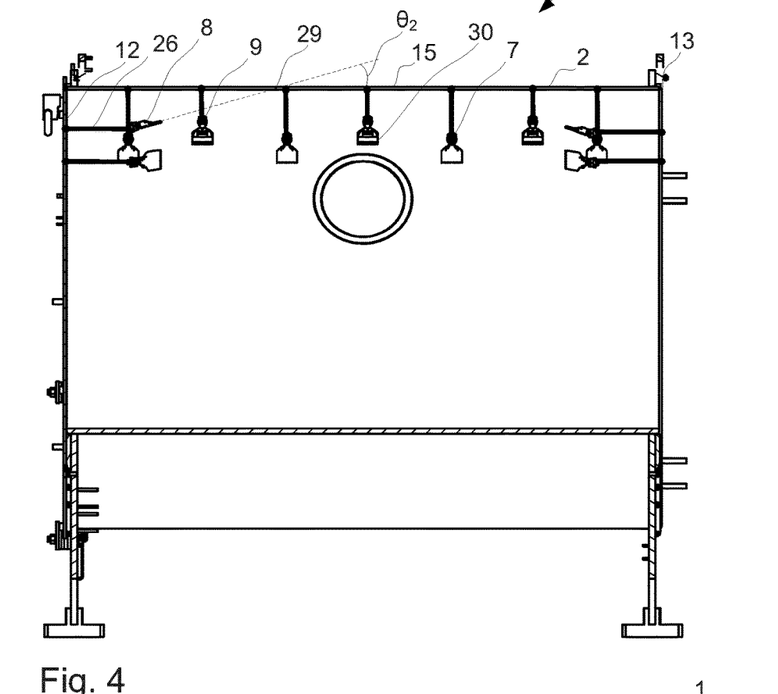
FIG. 4 is a side sectional view of the apparatus of FIG. 1.

Referring now to FIG. 4, a side view of the apparatus 1 is shown. The pipes 26 for the second set of jet nozzles 8 may alternatively as illustrated in FIG. 4 be attached to the back wall 12 or the front wall 13. The second set of jet nozzles 8 are arranged to direct the flow of air towards the ceiling 15. The impact angle $\theta 2$ of the flow of air hitting the ceiling 15 is between 5 and 25 degrees relative to the ceiling 15. The impact angle $\theta 2$ may be between 10 and 20 degrees, or even between 8 and 18 degrees. The point of impact 29 of the air flow on the ceiling 15 may be between 10 and 80 centimeters from the outlet of the jet nozzle 8, or may even be outside this range. As best shown in FIG. 4, each of the jet nozzles 7, 8, 9 may include a flat fan nozzle having a fan-shaped outlet 30 that is configured to eject the air in a fan-shaped air flow pattern across the corresponding surface. Other types of nozzles may be suitable and the different sets of jet nozzles 7, 8, 9 may have the same or types of nozzles.

Figure 5:
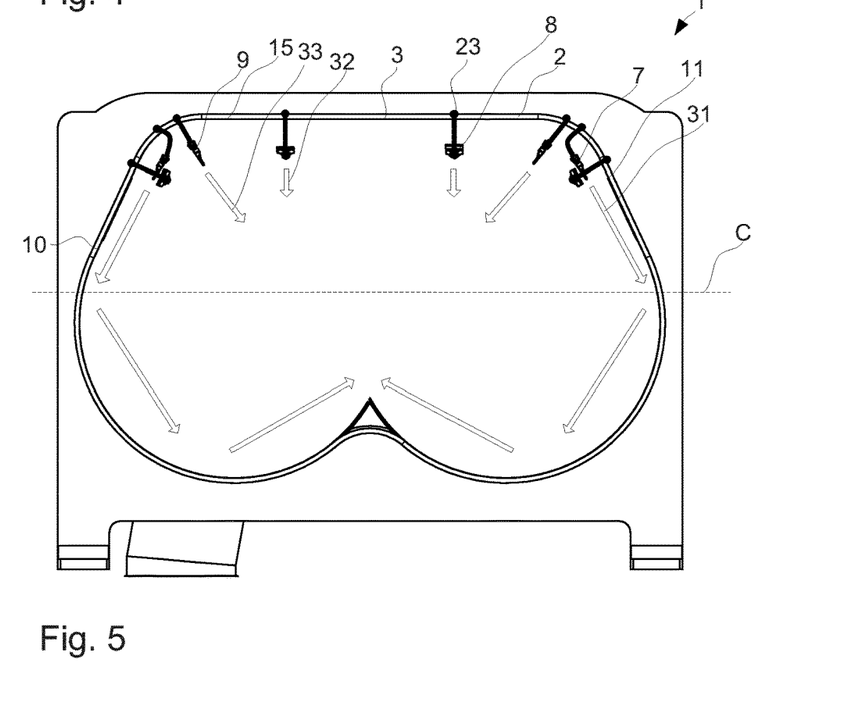
FIG. 5 is a front sectional view of the apparatus of FIG. 1 showing an air flow path in the container.

Referring now to FIG. 5, an air flow path in the container 2 of the apparatus 1 is shown. The air flow path may be continuous around the interior surface 3. Air may be fed to the sets of jet nozzles 7, 8, 9 at any suitable flow rate. Feeding the air may occur at a flow rate that is between 40 and 200 normal cubic meters per hour ($Nm^3/h$) per square meter of the area of the interior surface 3 of the container 2. A "normal cubic meter" means one cubic meter of air at a temperature of zero degrees at a pressure of 1.01325 bar. Feeding the air may also occur at a flow rate that is between 40 and 200 cubic meters per hour, where the air has the same temperature and pressure as the air surrounding the apparatus 1. The interior surface area may include the area of the rotatable stirring device 16, 17 (shown in FIGS. 2 and 3) or any other mixing device arranged in the container 2. Feeding the air may include varying the air flow through at least one of the jet nozzles 7, 8, 9 to temporarily increase the air flow through the corresponding jet nozzle 7, 8, 9, such that the air supply is pulsated. The flow rate during feeding is dependent on the application and in exemplary applications, feeding the air may occur at a flow rate that is between 110 and 130 $Nm^3/h$, or between 110 and 130 $m^3/h$ (surrounding temperature and pressure). Feeding the air to the jet nozzles 7, 8, 9 may include feeding the air with a flow rate that provides a velocity of the air that is at least 5 meters per second (m/s) at the point of impact 28.

Air may be drawn from the container 2 at any suitable flow rate. Drawing the air from the container 2 may occur at a flow rate that is between 60 and 240 $Nm^3/h$, or between 60 and 240 $m^3/h$ (surrounding temperature and pressure), per square meter of the area of the interior surface 3 of the container 2. The flow rate during drawing is dependent on the application and in exemplary applications, drawing the air may occur at a flow rate that is between 130 and 150 $Nm^3/h$, or between 130 and 150 $m^3/h$ (surrounding temperature and pressure).

As shown in FIG. 5, the first set of jet nozzles 7 may be configured to direct a flow of air 31 downwardly along the side walls 10, 11. The shape of the container 2 may force the air to flow concavely upwardly from a bottom of the container 2 toward the horizontal center-plane C. The second set of jet nozzles 8 may be configured to direct a flow of air 32 along the ceiling 15. The flow of air 32 may be directed from the back of the container 2 toward the front of the container 2 or vice versa, such that the air hits the front and back walls 12, 13 (shown in FIG. 2) after the air passes the ceiling 15. The third set of jet nozzles 9 are configured to direct a flow of air 33 toward the horizontal center-plane C of the container 2. The nozzles may be operated intermittent so that no air flows collides and interfere with each other.

Figure 6:
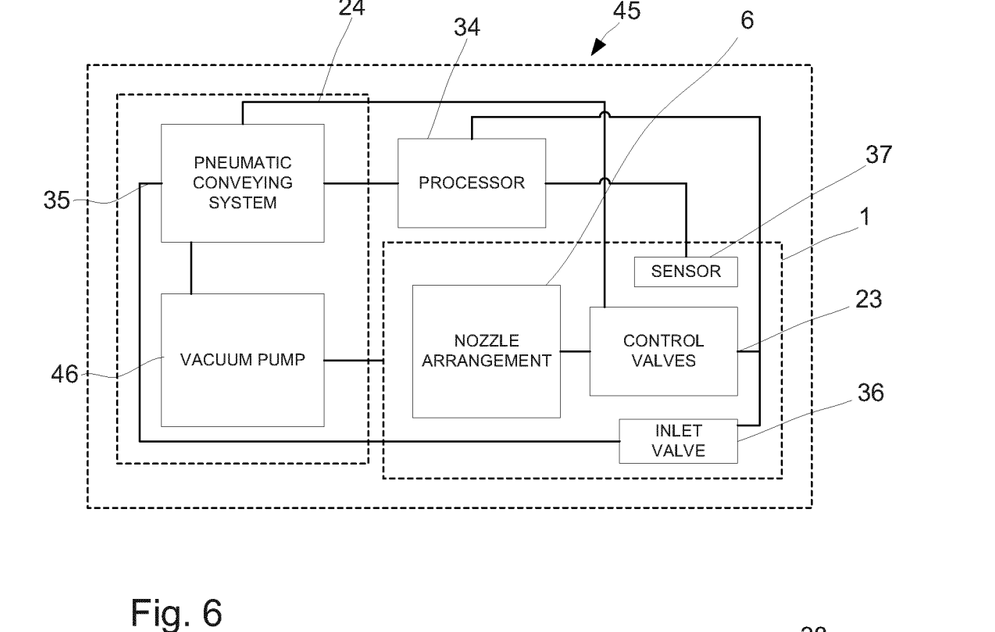
FIG. 6 is a schematic drawing of a control system for the apparatus of FIG. 1.

FIG. 6 shows an exemplary control system 45 for the apparatus 1. The cleaning process may be automated using the control system 45 which includes a processor 34 that is communicatively coupled with the control valves 23 for activation of the control valves 23, and a pneumatic conveying system 35 that is configured to supply air to the nozzle arrangement 6. The control valves 23 may be solenoid valves and the processor 34 may include any suitable processors and electronic control mechanisms, such as, for example, a central processing unit (CPU), a microprocessor, control circuitry, and the like.

The pneumatic conveying system 35 may include a compressor and the control system 45 may control the compressor to feed the air to the supply line 24 at the predetermined flow rate, e.g. a flow rate that is between 40 and 200 $Nm^3/h$. The control system 45 may be used to maintain constant pressure in the supply line 24. The processor 34 may activate the jet nozzles 7, 8, 9 of the nozzle arrangement 6 sequentially, such that the feeding of air to the container 2 provides an air flow that varies over time through the jet nozzles. The control system 45 may also be used to vary the air flow through at least one of the jet nozzles to temporarily increase the air flow through the jet nozzle. Any specific sequence of air flow in the container 2 may be provided using the control system 45. Pulsated air flow, alternating air flow speeds, and different flow rates for different jet nozzles may be provided.

Figure 7:
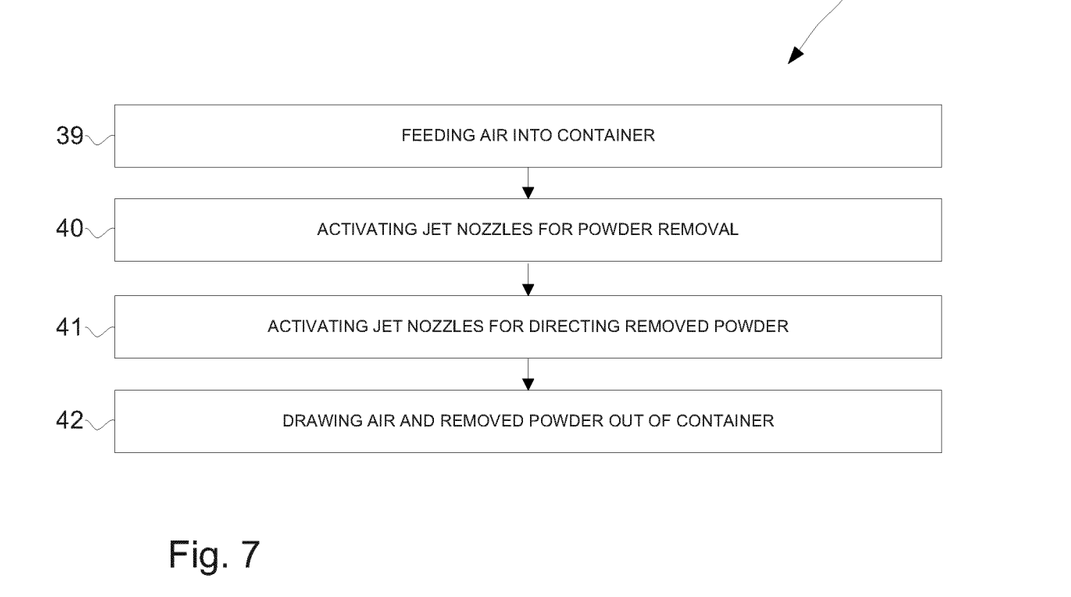
FIG. 7 is a flow chart of a method for cleaning an apparatus like the apparatus of FIG. 1.

The pneumatic conveying system 35 may also be fluidly connected to the vacuum pump 25 for creating a suction effect that draws the air and the powder out of the powder outlet 5 of the container 2 (shown in FIG. 1). The vacuum pump 46 may be operable independently from the nozzle arrangement 6. The container 2 may be enclosed such that air may only exit through the powder outlet 5. If more air is drawn out of the container 2 than is being supplied to the container 2, the container 2 may include another additional inlet valve 36 for supplying more air into the container 2. The inlet valve 36 may be a one-way valve that enables air to unilaterally pass through the valve into the supply line 24 for the container 2. The inlet valve 36 may be arranged as part of the container 2 or outside the container 2. Any suitable sensor 37, such as a pressure sensor for detecting pressure in the supply line 24, may be a part of the apparatus 1 such that the processor 34 may activate the inlet valve 36 and the control valves 23 in response to the detected data by the sensor 37. Alternatively, the inlet valve 36 is a regular, mechanical pressure (vacuum) relief valve. Referring now to FIG. 7, a method 38 for cleaning an apparatus for handling a food product powder is shown. The apparatus 1 shown in FIGS. 1-5 and the control system 45 shown in FIG. 6 may be used to perform the method 38. The method 38 includes a step 39 of feeding air into the container 2 using the nozzle arrangement 6 that is attached to the container 2. The air is directed by a plurality of jet nozzles 7, 8, 9 towards the interior surface 3 to remove product powder from the interior surface 3. Step 39 may include feeding the air into the container 2 with a flow rate of between 40 and 200 $Nm^3/h$ per $m^2$ of interior surface area of the container 2, or with another flow rate as previously indicated. Step 39 may include feeding the air into the container 2 with a flow rate that provides a velocity of the air of at least 5 m/s at a point of impact 28, 29 of the air against the interior surface 3 of the container 2. Step 39 may include varying the air flow through at least one of the jet nozzles 7, 8, 9 to thereby temporarily increase the air flow through at least one jet nozzle 7, 8, 9 and cause powder release from the interior surface 3.

A step 40 of the method 38 includes activating the jet nozzles 7, 8, 9. Step 40 may include activating the jet nozzles 7, 8, 9 sequentially, such that the feeding of air into the container 2 provides an air flow that varies over time through the jet nozzles 7, 8, 9. Step 40 may include activating jet nozzles for powder removal and a step 41 may include activating jet nozzles for directing the removed powder to the center of the container 2. During step 40, the first set of jet nozzles 7 and the second set of jet nozzles 8 may be activated and during step 41, the third set of jet nozzles 9 may be activated. The activation of the jet nozzles during either step 40 or during step 42 may also be activated sequentially.

A step 42 of the method 38 includes drawing air out from the container 2, such that air and the removed product powder may flow out of the container 2 via the powder outlet 5. Step 42 may include drawing the air from the container 2 at a flow rate of a 60-240 $Nm^3/h$ per $m^3$ volume defined by the interior surface 3 of the container 2, or drawing air at another flow rate as previously indicated. The method 38 is a dry-cleaning method, i.e. no liquid is supplied into the sealable container 2 when the method is performed.

The apparatus 1 for handling a food product powder including the nozzle arrangement 6 is advantageous in providing more efficient cleaning of the apparatus. The jet nozzles in the nozzle arrangement are configured to direct a flow of air at an interior surface of the sealable container to remove the residual product powder from the interior surface. The removed product powder and the air may flow out of the container via the powder outlet and a vacuum pump, such that the manual cleaning process for the apparatus may be less intensive or eliminated. In addition to providing a more efficient cleaning process, using the nozzle arrangement advantageously enables a more sanitary cleaning process due to the container being able to remain sealed during the cleaning process.

From the description above follows that, although various embodiments of the invention have been described and shown, the invention is not restricted thereto, but may also be embodied in other ways within the scope of the subject-matter defined in the following claims.

The invention claimed is:

1. An apparatus for handling a food product powder, the apparatus comprising:
   a sealable container having an interior surface defining a volume in which the food product powder is handled, and a powder outlet, the interior surface defining a volume in which the food product powder is handled, the inner surface comprising a front wall and a back wall opposite to the front wall, a ceiling extending between the front wall and the back wall, and a first side wall and a second side wall opposite the first side wall; and
   a nozzle arrangement that is attached to the container and configured to feed air into the container, wherein
   the nozzle arrangement comprises a plurality of jet nozzles configured to direct the air towards the interior surface to remove food product powder from the interior surface, such that the air and the removed food product powder flows out of the container via the powder outlet,
   wherein the apparatus is a mixing apparatus comprising at least one rotatable stirring device for the food product powder, the rotatable stirring device being mounted on the back wall and extending through the volume of the sealable container when assembled with the apparatus, wherein the rotatable stirring device comprises a first rotatable shaft and a second rotatable shaft, and the container is configured to accommodate rotation of the first rotatable shaft and the second rotatable shaft;

wherein the plurality of jet nozzles are arranged to ensure coverage of the area of the interior surface so that food product powder is removed from the surface area of the inner surface, wherein the plurality of jet nozzles comprises a first set of jet nozzles arranged to direct the air flow towards the first side wall and the second side wall, a second set of jet nozzles, and a third set of jet nozzles arranged to direct the air flow towards a horizontal center plane of the sealable container, wherein the first side wall and the second side wall are each formed to have a concave shape on their inside at the bottom of the sealable container, the first set of jet nozzles being configured to run along the first side wall and the second side wall to direct the air flow downwardly, wherein the shape of the sealable container forces the air to flow from the bottom of the container concavely upwardly towards the horizontal center plane, and wherein the interior surface area comprises an area of the rotatable stirring device.

2. The apparatus according to claim 1, wherein the first set of jet nozzles are arranged to direct the flow of air towards the first and second side walls such that the impact angle of the flow of air hitting the first and second side walls is between 5 and 25 degrees relative to the respective side wall.

3. The apparatus according to claim 1, wherein
the second set of jet nozzles are arranged to direct a flow of air towards the ceiling.

4. The apparatus according to claim 3, wherein the second set of jet nozzles are arranged to direct the flow of air towards the ceiling such that the impact angle of the flow of air hitting the ceiling is between 5 and 25 degrees relative to the ceiling.

5. The apparatus according to claim 1, wherein the plurality of jet nozzles comprises flat fan jet nozzles that are arranged to eject the air in a fan-shaped air flow pattern.

6. The apparatus according to claim 1, wherein the nozzle arrangement comprises a plurality of control valves that are configured to independently control the flow of air through different jet nozzles of the plurality of jet nozzles such that the flow of air is different through at least some of the different jet nozzles.

* * * * *